Figure 1:
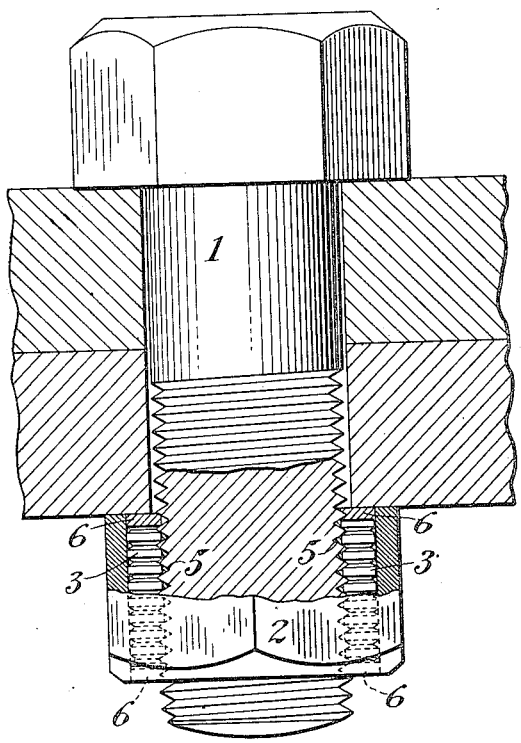

M. JACOBS.
SELF LOCKING NUT AND BOLT.
APPLICATION FILED JUNE 22, 1908.

922,482.

Patented May 25, 1909.
3 SHEETS—SHEET 1.

Witnesses:
Wm. Ashley Kelly
Victor D. Borst

Inventor:
Morris Jacobs
by Henry D. Williams
Attorney.

M. JACOBS.
SELF LOCKING NUT AND BOLT.
APPLICATION FILED JUNE 22, 1908.

922,482.

Patented May 25, 1909.
3 SHEETS—SHEET 2.

Witnesses:
Wm. Ashley Kelly
Victor D. Borst

Inventor:
Morris Jacobs
by Henry D. Williams
Attorney.

M. JACOBS.
SELF LOCKING NUT AND BOLT.
APPLICATION FILED JUNE 22, 1908.
922,482.
Patented May 25, 1909.
3 SHEETS—SHEET 3.
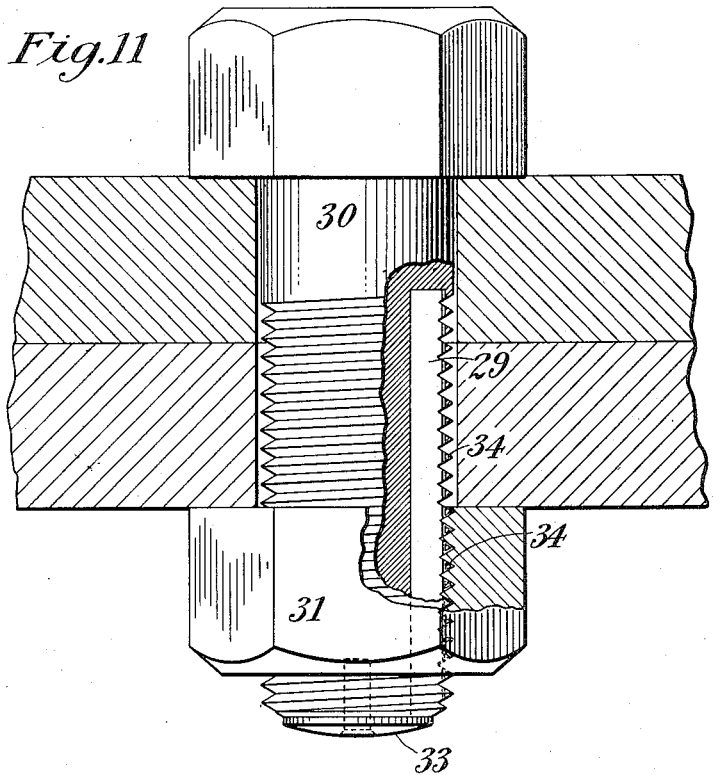
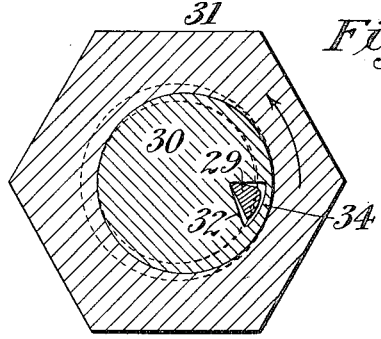
Witnesses:
Wm. Ashley Kelly
Victor D. Borst
Inventor:
Morris Jacobs
by Henry D. Williams
Attorney.

UNITED STATES PATENT OFFICE.

MORRIS JACOBS, OF NEW YORK, N. Y.

SELF-LOCKING NUT AND BOLT.

No. 922,482.      Specification of Letters Patent.      Patented May 25, 1909.

Application filed June 22, 1908. Serial No. 439,713.

*To all whom it may concern:*

Be it known that I, MORRIS JACOBS, a citizen of the United States, residing at the borough of Brooklyn, city of New York, in the county of Kings and State of New York, have invented a certain new and useful Improvement in Self-Locking Nuts and Bolts, of which the following is a specification, reference being had therein to the accompanying drawings, forming part thereof.

My invention relates to means for locking coöperative screw-threaded parts, such as bolts and nuts, against accidental or unintentional unscrewing, as often disastrously occurs by reason of vibrations and jars attendant with use, particularly on vehicles of all kinds, railroad fish plates, bridges, agricultural machinery, engines, and the like; and the principal object of my invention is to provide simple and inexpensive means for retaining the locking member in one of the coöperative screw-threaded parts for convenience in use and to prevent separation and loss of the locking member.

Other objects and advantages of my invention will appear from the following description.

My invention includes a locking member carried by one of the coöperative screw-threaded parts and adapted to be moved or shifted in a cavity therein to and from locking engagement with the threaded surface of the other coöperative screw threaded part, the cavity extending only partly through the screw-threads so as to leave portions of the threads continuous and extending across the side of the cavity to prevent the loss of the locking member when the screw-threaded parts are not in coöperative relation, the openings or slots between the continuous portions of the threads permitting locking engagement of the locking member, but the cavity being closed to the exit or escape of the locking member.

My present invention is not restricted to a particular kind or description of locking member, nor does it matter, so far as the present invention is concerned, in which of the coöperative screw-threaded parts the locking member is located, as the present invention relates to means for retaining the locking member in the cavity provided for its reception. For example, the locking member may be a locking roller or clutch roller, or it may be a rockable locking bar or cam rocker; also the locking member may be provided with teeth separated by grooves for receiving the screw threads of the coöperative screw-threaded part, or such grooves and resultant teeth may be omitted.

I shall now describe my invention with reference to the accompanying drawings, and shall thereafter point out my invention in claims.

Figure 2:
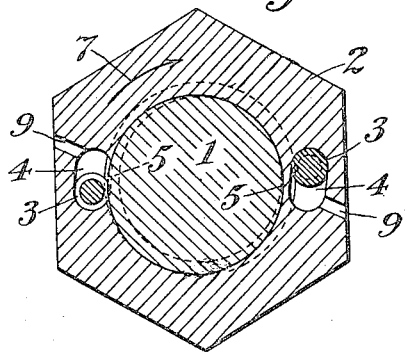
Figure 3:
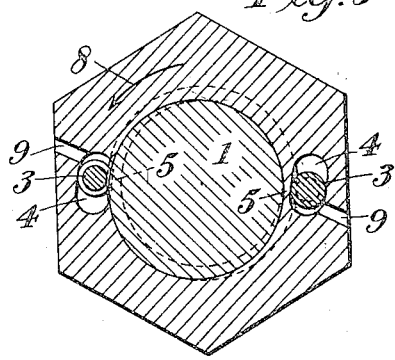
Figure 5:
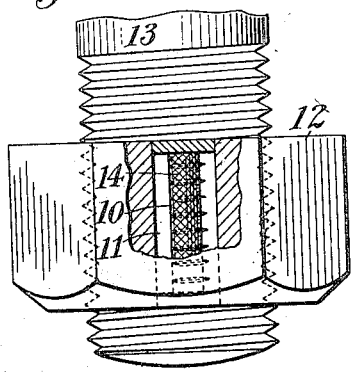
Figure 4:
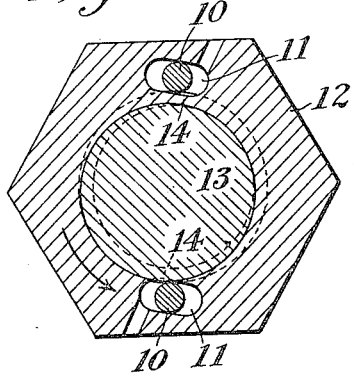
Figure 6:
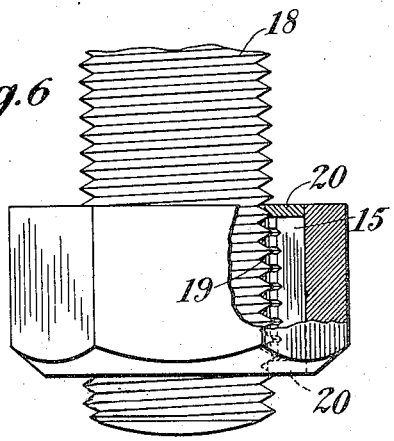
Figure 7:
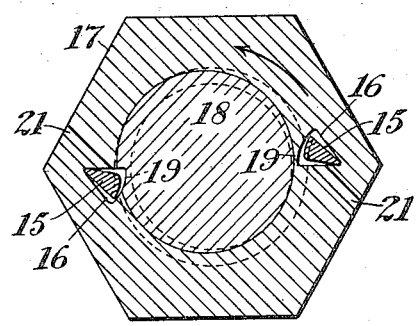
Figure 8:
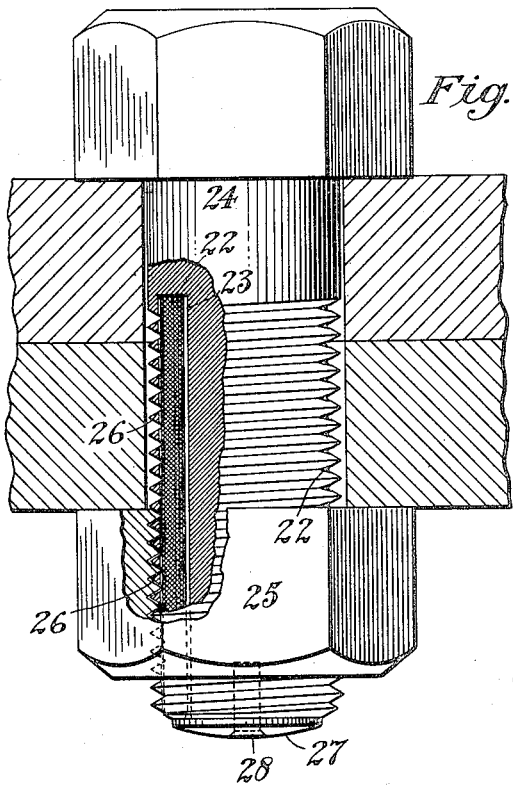
Figure 9:
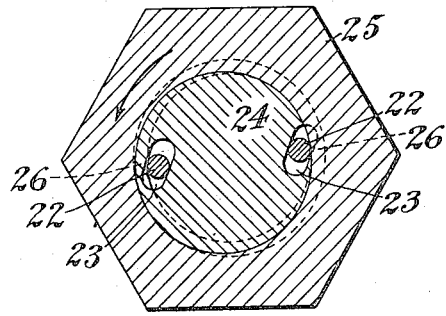
Figure 10:
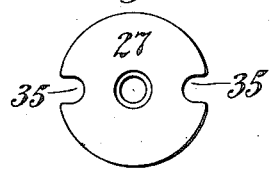

Figure 1 is an elevation, partly in section, showing a self-locking nut embodying my invention, locked on the bolt and coacting with the bolt in clamping two objects together. Fig. 2 is a cross-section through the bolt, nut and locking rollers as viewed from the outer or screw end of the bolt, and shows the locking rollers in non-locking position. Fig. 3 is a similar view, but with the locking rollers rolled to locking position. Fig. 4 is a view similar to Fig. 3, but with the nut rotated one-quarter turn, of a slightly modified construction, wherein the circumferential teeth or annular ridges are omitted from the locking rollers. Fig. 5 is an elevation, partly in section, showing the nut of Fig. 4 locked on a bolt, portions of which are broken away. Fig. 6 is an elevation, partly in section, of a portion of a bolt and a self-locking nut locked thereon, showing another modified construction wherein cam rockers or rockable locking bars are employed instead of locking rollers. Fig. 7 is a cross-section through the bolt, nut and cam rockers of Fig. 6 as viewed from the outer or screw end of the bolt and shows the cam rockers rocked to locking position. Fig. 8 is a view similar to Fig. 1 of another modified construction wherein the locking members, shown as locking rollers, are located in the bolt instead of in the nut. Fig. 9 is a view similar to Fig. 3 of the modified construction shown in Fig. 8. Fig. 10 is a plan view of an end washer or roller retaining disk shown at the end of the bolt in Fig. 8. Fig. 11 is a view similar to Fig. 8 of a further modified construction, wherein a locking cam rocker is located in the bolt. Fig. 12 is a view similar to Fig. 9 of the modified construction of Fig. 11.

In the embodiment of my invention illustrated in Figs. 1, 2 and 3 of the drawings, an ordinary bolt 1 has secured thereon a self-locking nut 2 provided with locking means, shown as two locking rollers or clutch rollers 3 contained in longitudinally extending cavities 4 formed in the nut 2. The locking rollers 3 are retained in the cavities 4 and prevented from escaping therefrom, whether the nut is on or off the bolt, by the walls of the cavities themselves. The cavities 4 extend into and partly through the screw threads of the nut and extend far enough into the screw threads of the nut to permit the screw threads of the bolt to extend into the cavities and engage the locking rollers, but leaving the portions 5 of the screw threads of the nut continuous, these continuous or unbroken portions 5 of the threads extending across the sides of the cavities and retaining the locking rollers in the cavities when the screw-threaded parts are not in coöperative relation or when the nut is off the bolt, thus preventing escape and loss of the locking rollers by dropping to the inside of the nut; it being noted that escape in other directions is prevented by the closed walls of the cavities.

The cavities 4 are shown as closed at their ends by plugs 6, which may be driven firmly therein. The plugs 6 prevent the escape of the locking rollers longitudinally and also protect the locking devices from the elements, preventing the entrance of dust and the like and moisture. The opening or space which is closed or occupied by a plug 6 at one end of each of the cavities 4 is needed to enable the cavity to be cut out or otherwise formed and also to permit of the insertion of the locking roller into the cavity; but, for the sake of convenience in forming the cavities 4, such cavities are first formed extending entirely through the nut and then both ends of each cavity are closed by plugs 6.

The roller-retaining cavities 4 are shown as of elongated cross-section with opposite substantially plane parallel sides joined by rounded or semi-cylindrical portions conforming in contour to the cylindrical rollers
3. The outer plane sides of the cavities form inclined cam surfaces along which the locking rollers roll to and from locking position. In the unlocked position (Fig. 2) the locking rollers 3 are in contact with the outermost curved portions of the walls of the cavities 4 and are then only in slight frictional contact with the threads of the bolt 1, permitting the nut to be freely screwed on, as indicated by the arrow 7; but this contact is sufficient to cause the rollers 3 to be rolled or pressed against the inclined cam surfaces of the cavities when the nut tends to turn in an opposite direction, as indicated by the arrow 8 in Fig. 3, and to tightly bind between the nut and the bolt and form a secure lock. As the locking rollers move or roll to locking position, they move out of contact with the outermost curved or cylindrical portions of the walls of the cavities and toward the opposite or innermost cylindrical curved wall portions, as shown in Fig. 3; the amount or extent of such movement, however, as indicated in the drawings, is greatly exaggerated for the sake of clearness in illustration, as in practice such movements are substantially imperceptible.

To secure a firmer locking effect, the locking rollers 3 are provided with annular V-shaped grooves with intervening circumferential teeth or ridges, as shown in the drawings, which are substantially in alinement with the threads of the nut so that the threads of the bolt fit into the grooves. The circumferential teeth are not sharp or V-shaped, but are blunt with cylindrical faces and fit into the outer portions only of the threads of the bolt and leave space or room in or between the threads of the bolt for the passage of the continuous roller-retaining threads 5. These continuous thread portions 5, extending across or transversely to the sides of the cavities 4, form cages, consisting of bars with slots between, these thread bars preventing the escape of the locking rollers 3 when the nut is not on the bolt, and the intervening slots, formed by the cavities 4 extending into the threads, permitting the locking rollers 3 to engage the threads of the bolt, which extend into such slots.

Small apertures or holes 9 are provided in the sides of the nut, through which wires or keys suitable for the purpose may be inserted to push the locking rollers to non-locking position and to hold them there when it is desired to unscrew the nut. Incidentally, the holes 9 also serve the valuable function of admitting oil to the locking devices.

In the modification illustrated in Figs. 4 and 5, locking rollers 10 are provided in which the circumferential teeth are omitted, this omission of the teeth being the only substantial feature in which this construction differs from that above described. Instead of teeth, the locking rollers 10 are provided with knurled or roughened cylindrical surfaces, which frictionally engage the threads of the bolt. The rollers 10 are shown as of smaller diameter than the toothed rollers 3 and, therefore, correspondingly smaller cam-surfaced cavities 11 are provided in the nut 12, shown as locked on the bolt 13. Continuous thread portions 14 of the nut retain the locking rollers in the cavities when the nut is not on the bolt, and these thread portions 14 are of larger cross-section than the corresponding thread portions 5 (Figs. 1, 2 and 3) because of the fact that the omission of the teeth from the locking rollers requires a correspondingly less cutting away of the threads of the nut or of encroachment on these threads by the roller-retaining cavities.

In the modification illustrated in Figs. 6 and 7, locking cam rockers 15 are provided in lieu of locking rollers, these cam rockers being contained in cavities 16 of suitable cross-section or shape provided in a nut 17, shown as locked on a bolt 18. Continuous thread portions 19 of the nut prevent the escape of the locking cams or cam rockers when the nut is not on the bolt, and the ends of the cavities 16 are closed by suitable plugs 20. The cam rockers 15 have rounded cam-shaped locking faces, shown as provided with transverse teeth for frictionally engaging the threads of the bolt 18 and are adapted to rock in the cavities 16 on fulcrum edges to and from locking position. Apertures 21 are provided in the sides of the nut for the insertion of suitable means to push the cam rockers 15 to non-locking position and to hold them there while the nut is intentionally unscrewed. The continuous thread portions 19 act in the same manner to retain the cam rockers 15 in the nut 17 as the thread portions 5 and 14 (Figs. 1 to 5, inclusive) act to retain the respective locking rollers 3 and 10 in the nuts 2 and 12, respectively.

Figs. 8, 9 and 10 show my improvement applied to a modified construction in which the locking member is carried by the bolt instead of by the nut, as in the above-described constructions. Two cylindrical knurled or roughened locking rollers 22 are contained in cam-surfaced cavities 23, provided longitudinally of a screw-threaded bolt 24, on which is locked an ordinary nut 25. The principal difference between this construction and that illustrated in Figs. 4 and 5 lies in the fact that the locking rollers are contained in the bolt instead of in the nut. Continuous thread portions 26 confine the locking rollers in the cavities in the bolt when the nut is not on the bolt. The cavities 23 and contained locking rollers 22 extend longitudinally of the bolt 24 substantially throughout the threaded portion thereof. The continuous thread portions 26 of the bolt protect the locking rollers 22 from interference with their locking action by objects through which the bolt may pass. The locking rollers 22 are retained in the cavities 23 in a longitudinal direction by a rotatable peripherally notched retaining-disk 27, which is permanently secured to the screw-threaded end of the bolt 24 by a pivot pin 28 driven into a terminal axial bore in the end of the bolt. The retaining-disk 27 is arranged to rotate with some friction on this pivot pin 28 to bring peripheral notches 35 into and out of alinement with the notched cavities 23 as desired. When the notches 35 are not in alinement with the outer ends of the cavities 23, the disk 27 will retain the locking rollers 22 in such cavities and also will protect the locking devices, and when the retaining-disk 27 is rotated to bring the notches 35 opposite to the roller-containing cavities, access may be had to the locking rollers so that suitable devices may be inserted to push the locking rollers to non-locking position for intentional unscrewing of the nut 25.

In the modification illustrated in Figs. 11 and 12, a rockable locking bar or cam rocker 29 is carried by a bolt 30, on which is locked an ordinary nut 31. This construction differs from that last described chiefly in the fact that a cam rocker is employed instead of locking rollers, and differs from the construction illustrated in Figs. 6 and 7 chiefly in the fact that the cam rocker is carried by the bolt instead of by the nut as there shown. The cam rocker 29 is fulcrumed on a rocking edge in a rocker-receiving cavity 32 and has, as shown, a toothed cam surface adapted to frictionally engage the screw threads of the coöperative nut 31. Escape of the locking cam in a longitudinal direction is prevented by a retaining-disk 33, and lateral escape, when the nut is off the bolt, is prevented by continuous thread portions 34 of the bolt, forming rocker-retaining bars which extend across the outer side of the cavity 32.

In the above description and as illustrated in the drawings, screw-threaded parts with "right-hand" threads only are considered, but it is perfectly obvious that for "left-hand" threads merely a correspondingly reversed construction of the locking devices is required.

It is to be noted that the principle employed in reference to the means for retaining the locking members against separation is the same in all of the modifications illustrated and that there is virtually no modification of the invention as embodied in such retaining means and that the modifications are solely in other parts, that is, substantially the same retaining means are shown as employed to retain against loss a plurality of different kinds of locking members. The several different kinds of locking members shown are of the self-tightening variety, that is to say, they tend to tighten or screw up the nut when subjected to vibration, so that if a nut is left partly unscrewed, it will tighten up of its own accord when agitated or vibrated. Many practical embodiments of the invention in highly effective constructions, such, for example, of locking rollers carried by the nut, are extremely easy and inexpensive to manufacture, and they effectively overcome the great inconvenience of separable locking members and obviate any possibility of losing the locking members, which are always in place ready for immediate use.

It is obvious that various modifications may be made in the constructions shown and above particularly described within the principle and scope of my invention.

I claim:

1. The combination of two coöperative screw-threaded parts, one of such parts having a cavity provided therein, and a locking member located in the cavity and adapted to be frictionally engaged by the other coöperative screw-threaded part to shift the locking member in the cavity and adapted to be retained in the cavity solely by the walls of the cavity, the conformation of these walls being such as to retain the locking member in the cavity when the screw-threaded parts are not in coöperative relation.

2. The combination of two coöperative screw-threaded parts, one of these parts having a cavity provided therein, a locking member in the cavity and adapted to be shifted to and from locking position relatively to the other screw-threaded part, and means for continuously retaining the locking member in the cavity at all times, including when the coöperative screw-threaded parts are not in coöperative relation, such means including continuous thread portions extending across one side of the cavity.

3. The combination of two coöperative screw-threaded parts, one of such parts having a cavity provided therein extending into and partly through the screw-threaded portion thereof so as to leave portions of the screw threads continuous, and a locking member located in the cavity and adapted to be shifted therein to and from locking position relatively to the other screw-threaded part, the continuous portions of the threads retaining the locking member in the cavity when the screw-threaded parts are not in coöperative relation.

4. The combination of two coöperative screw-threaded parts, one of such parts having a cavity provided therein extending into and partly through the screw-threaded portion thereof so as to leave portions of the screw-threads continuous, and a locking member located in the cavity and adapted to be frictionally engaged by the other coöperative screw-threaded part to shift the locking member in the cavity, the continuous portions of the threads retaining the locking member in the cavity when the screw-threaded parts are not in coöperative relation.

5. The combination of two coöperative screw-threaded parts, one of such parts having a cavity provided therein, a locking member in the cavity and adapted to be frictionally engaged by the other coöperative screw-threaded part to shift the locking member in the cavity, and means for retaining the locking member in the cavity longitudinally of the screw-threaded parts, portions of the screw threads being continuous across one side of the cavity to retain the locking member in the cavity when the screw-threaded parts are not in coöperative relation.

6. The combination of two coöperative screw-threaded parts, one of these parts having a cavity provided therein, a locking member in the cavity and adapted to be frictionally engaged by the other coöperative screw-threaded part to shift the locking member in the cavity, and means for continuously retaining the locking member in the cavity at all times, including when the coöperative screw-threaded parts are not in coöperative relation, such means including thread portions partly closing one side of the cavity.

7. The combination of two coöperative screw-threaded parts, one of such parts having provided therein an elongated cavity adapted to receive an elongated locking member, such cavity extending in its longitudinal direction transversely of the threads, and an elongated locking member confined in the cavity and adapted to be shifted in the cavity by frictional engagement with the other coöperative screw-threaded part and adapted to be retained in the cavity solely by the walls of the cavity, the conformation of these walls being such as to retain the locking member in the cavity when the screw-threaded parts are not in coöperative relation.

8. The combination of two coöperative screw-threaded parts, one of such parts having provided therein an elongated cavity adapted to receive an elongated locking member, such cavity extending in its longitudinal direction transversely of the threads, an elongated locking member confined in the cavity and adapted to be frictionally engaged by the other coöperative screw-threaded part to shift the locking member in the cavity, and means for continuously retaining the locking member in the cavity at all times, including when the coöperative screw-threaded parts are not in coöperative relation, such means including thread portions partly closing one side of the cavity.

9. The combination of two coöperative screw-threaded parts, one of such parts having provided therein an elongated cavity adapted to receive an elongated locking member, such cavity extending in its longitudinal direction transversely of the threads, an elongated locking member confined in the cavity and adapted to be shifted in the cavity by frictional engagement with the other coöperative screw-threaded part, and means for retaining the locking member in the cavity longitudinally of the screw-threaded parts, portions of the screw threads being continuous across one side of the cavity to retain the locking member in the cavity when the screw-threaded parts are not in coöperative relation.

10. The combination of two coöperative screw-threaded parts, one of such parts having provided therein a roller-receiving cavity forming a cam surface, such cavity extending in its longitudinal direction transversely of the threads, a locking roller confined in the cavity and adapted to be frictionally engaged by the other coöperative screw-threaded part to roll the locking roller along the cam surface of the cavity, and means for retaining the locking roller in the cavity longitudinally of the screw-threaded parts, portions of the screw threads being continuous across one side of the cavity to retain the locking roller in the cavity when the screw-threaded parts are not in coöperative relation.

11. The combination of two coöperative screw-threaded parts, one of such parts having provided therein a roller-receiving cavity forming a cam surface, such cavity extending transversely of the threads, a circumferentially toothed locking roller confined in the cavity and adapted to have its circumferential teeth frictionally engaged by the screw threads of the other coöperative screw-threaded part to roll the locking roller along the cam surface of the cavity, and means for retaining the locking roller in the cavity longitudinally of the screw-threaded parts, portions of the screw threads being continuous across one side of the cavity to retain the locking roller in the cavity when the screw-threaded parts are not in coöperative relation.

In testimony whereof I have affixed my signature in presence of two witnesses.

MORRIS JACOBS.

Witnesses:
WM. ASHLEY KELLY,
VICTOR D. BORST.